(12) United States Patent
Wenlin et al.

(10) Patent No.: US 11,440,776 B2
(45) Date of Patent: Sep. 13, 2022

(54) MONITORING SOLUTION FOR A CONVEYOR SYSTEM

(71) Applicant: Kone Corporation, Helsinki (FI)

(72) Inventors: Henri Wenlin, Helsinki (FI); Antti Saarelainen, Helsinki (FI); Janne Rossi, Helsinki (FI); Asmo Tenhunen, Helsinki (FI)

(73) Assignee: Kone Corporation, Helsinki (FI)

( * ) Notice: Subject to any disclaimer, the term of this patent is extended or adjusted under 35 U.S.C. 154(b) by 75 days.

(21) Appl. No.: 17/032,597

(22) Filed: Sep. 25, 2020

(65) Prior Publication Data

US 2021/0016999 A1 Jan. 21, 2021

Related U.S. Application Data

(63) Continuation of application No. PCT/FI2019/050296, filed on Apr. 12, 2019.

(30) Foreign Application Priority Data

Apr. 19, 2018 (EP) .................................... 18168121

(51) Int. Cl.
*B66B 25/00* (2006.01)
*H02P 29/66* (2016.01)
(Continued)

(52) U.S. Cl.
CPC .............. *B66B 25/006* (2013.01); *B66B 1/30* (2013.01); *B66B 1/32* (2013.01); *B66B 1/3461* (2013.01);
(Continued)

(58) Field of Classification Search
CPC . H02P 29/662; H02P 6/16; H02P 6/24; B66B 25/006; B66B 1/30; B66B 1/32;
(Continued)

(56) References Cited

U.S. PATENT DOCUMENTS 5,392,898 A 2/1995 Burgess, Jr. et al.
5,785,165 A * 7/1998 Stahlhut .................. B66B 25/00
198/322
(Continued)

FOREIGN PATENT DOCUMENTS

CN 101599666 A 12/2009
CN 102648142 A 8/2012
(Continued)

OTHER PUBLICATIONS

International Search Report PCT/ISA/210 for International Application No. PCT/FI2019/050296 dated Jun. 20, 2019.
(Continued)

*Primary Examiner* — James R Bidwell
(74) *Attorney, Agent, or Firm* — Harness, Dickey & Pierce, P.L.C.

(57) ABSTRACT

The present invention relates to a conveyor system comprising: a drive machine, a conveyor control unit configured to control operation of a conveyor device, a sensor array comprising at least one sensor mounted to the drive machine and adapted to measure one or more properties of the drive machine, a processing unit associated with the drive machine, wherein the processing unit is connected to the sensor array and configured to obtain and process measurement data from the sensor array to generate in-formation about an operation of the drive machine, and a communication channel between the conveyor control unit and the processing unit. The conveyor system may be an elevator system, an escalator system or a moving walk system.

21 Claims, 3 Drawing Sheets

(51) Int. Cl.
  *B66B 1/30* (2006.01)
  *B66B 1/32* (2006.01)
  *B66B 1/34* (2006.01)
  *B66B 5/00* (2006.01)
  *H02P 6/16* (2016.01)
  *H02P 6/24* (2006.01)
  *B66B 23/02* (2006.01)

(52) U.S. Cl.
  CPC .......... *B66B 1/3476* (2013.01); *B66B 5/0031* (2013.01); *H02P 6/16* (2013.01); *H02P 6/24* (2013.01); *H02P 29/662* (2016.11); *B66B 23/02* (2013.01); *B66B 25/003* (2013.01)

(58) Field of Classification Search
  CPC ... B66B 1/3461; B66B 1/3476; B66B 5/0031; B66B 23/02
  USPC .......................................... 198/322, 323, 330
  See application file for complete search history.

(56) References Cited

U.S. PATENT DOCUMENTS

| | | | |
|---|---|---|---|
| 6,328,136 B1 | 12/2001 | Tauchi et al. | |
| 6,351,096 B1* | 2/2002 | Jang | B66B 25/00 187/292 |
| 2005/0241883 A1 | 11/2005 | Zuzuly et al. | |
| 2011/0308894 A1 | 12/2011 | Korhonen et al. | |
| 2013/0025977 A1 | 1/2013 | Korhonen et al. | |
| 2014/0166434 A1* | 6/2014 | Liang | B66B 25/00 198/322 |
| 2015/0329318 A1 | 11/2015 | Cambruzzi et al. | |
| 2016/0318735 A1 | 11/2016 | Zhao | |
| 2017/0222577 A1 | 8/2017 | Anderson et al. | |
| 2017/0297874 A1 | 10/2017 | Borthakur et al. | |
| 2017/0355555 A1 | 12/2017 | Ginsberg et al. | |
| 2019/0284021 A1* | 9/2019 | Ferrisi | B66B 7/046 |

FOREIGN PATENT DOCUMENTS

| | | |
|---|---|---|
| CN | 104837756 A | 8/2015 |
| EP | 0856485 A1 | 8/1998 |
| JP | 2002-323911 A | 11/2002 |
| JP | 2004222387 A | 8/2004 |
| JP | 2007-336708 A | 12/2007 |
| JP | 2012-035946 A | 2/2012 |
| JP | 2016-183034 A | 10/2016 |
| WO | WO-2010/089450 A1 | 8/2010 |
| WO | WO-2015/193834 A1 | 12/2015 |
| WO | WO-2016/173823 A1 | 11/2016 |

OTHER PUBLICATIONS

Written Opinion of the International Searching Authority PCT/ISA/237 for International Application No. PCT/FI2019/050296 dated Jun. 20, 2019.

European Search Report for European Patent Application No. 18168121 dated Mar. 25, 2019.

Chinese Office Action dated Apr. 25, 2022 (corresponding to 201980026590.6).

Klein, Lawrence A.; Article published by Beijing Institute of Technology Press; 1999 (5 pages); http://img.sslibrary.com/n/slib/book/slib/11218209/daf3a46ff37b45ff903d7d99822ac44f/812713a41adb87cfea71e6c511f7b374.shtml?dxbaoku+tru...; http://www.wenhuakxjyty.en/n/dsrqw/book/base/11218209/c3e17b281d4c474cba1bf57c05fe9ac7/7712e4871baf05fbe4e5a23f9331eeb3.shtml?d . . . .

* cited by examiner

MONITORING SOLUTION FOR A CONVEYOR SYSTEM

CROSS-REFERENCE TO RELATED APPLICATION

This application is a continuation of PCT International Application No. PCT/FI2019/050296 which has an International filing date of Apr. 12, 2019, and which claims priority to European patent application number 18168121.4 filed Apr. 19, 2018, the entire contents of both of which are incorporated herein by reference.

TECHNICAL FIELD

The invention concerns in general the technical field of conveyor systems. More particularly, the invention concerns a solution for monitoring an operation of the conveyor system.

BACKGROUND

Conveyor systems, such as elevator systems, escalator systems and moving walk systems, are sophisticated solutions which comprise a plurality of operating entities. In order to derive operational information about the system separate sensors and actuators are used to obtain measurement data from the system in question and the data is analyzed for generating information on the operational status.

For example, an elevator drive comprises a drive unit and a hoisting machine. The drive unit is at least configured to supply electrical power to a hoisting motor and hoisting machinery brake coils of the hoisting machine to drive elevator car. Due to its essential role in elevator system an operation of the elevator drive is traditionally monitored in a plurality of ways by applying many separate sensors and actuators, wherein the sensors and actuators are positioned in applicable positions within the elevator drive, or in any other position being dependent on the operation of the elevator drive.

An example of the above described arrangement is given in a document US2013/0025977 A1.

The drawback of the existing sensor solutions is that the used sensors and actuators are general-purpose devices such that they are not designed for any specific elevator drive application. Quite opposite, they have been designed to fit into as wide variety of different applications as possible, which means they are often complicated, expensive and slow because of many overlapping processing and control functions. For example, the slowness of the sensor system may have an effect on ride comfort due to delayed controlling when some measurement data deviates from normal.

Furthermore, the measurement data from the sensors and similar is traditionally conveyed from the sensors residing in the machinery side of the elevator apparatus to a control unit through a dedicated cabling, which means that large amount of data is transferred from the machinery side to the control unit being distinct from the machinery side. This increases complexity of the elevator apparatus and causes delays in processing the measurement data.

The above described drawbacks also apply with respect to monitoring solutions implemented in the other conveyor systems.

Hence, there is need to introduce novel approaches for measuring and processing data obtained from the machinery side of a conveyor system in which the above described drawbacks may be mitigated at least in part.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a conveyor system for monitoring an operation of the conveyor system.

The objectives of the invention are reached by a conveyor system as defined by the respective independent claims.

According to a first aspect, a conveyor system is provided, the conveyor system comprising: a drive machine; a conveyor control unit configured to control operation of a conveyor device; a sensor array comprising at least one sensor mounted to the drive machine and adapted to measure one or more properties of the drive machine; a processing unit associated with the drive machine, wherein the processing unit is connected to the sensor array and configured to obtain and process measurement data from the sensor array to generate in-formation about an operation of the drive machine; and a communication channel between the conveyor control unit and the processing unit.

The processing unit may be configured to send to the conveyor control unit a data message containing information about an operation of the drive machine.

The processing unit may comprise a sensor fusion portion configured to determine at least one operational parameter of the drive machine from the measurement data obtained from the sensor array. Further, the processing unit may be configured to detect a non-optimal operation of the drive machine by detecting a deviation of the at least one operational parameter of the drive machine compared to a reference value.

The processing unit may be configured to send to the conveyor control unit a data message containing information about non-optimal operation of the drive machine. This information may be used for control and/or condition monitoring of the conveyor system.

The processing unit may be configured to generate condition information of the drive machine based on measurement data obtained from the sensor array.

The processing unit may be configured to send to the conveyor control unit a data message containing condition information of the drive machine. This information may be used for condition monitoring, as well as for predictive maintenance of the conveyor system.

Moreover, at least one sensor of the sensor array may be adapted to sense a position of a rotating axis of the drive machine relative to a drive machine frame, and wherein the processing unit may be configured to determine a load weight of the conveyor device based on the measurement data obtained from the at least one sensor adapted to sense the position of the rotating axis of the drive machine relative to the drive machine frame.

The processing unit may be configured to send to the conveyor control unit a data message containing information about load weight of the conveyor device.

At least one sensor of the sensor array may be adapted to sense a stray magnetic field of a drive motor of the drive machine, and wherein the processing unit may be configured to determine a rotor angle of the drive motor based on the measurement data obtained from the at least one sensor adapted to sense the stray magnetic field of the hoisting motor of the drive machine.

The processing unit may be configured to send to the conveyor control unit a data message containing information of rotor angle of the drive motor. This rotor angle information may be used for control of the drive motor, such as for vector control of the drive motor.

At least one sensor of the sensor array may be adapted to sense the stray magnetic field of the drive motor of the drive machine, when a conveyor is idle, and wherein the processing unit may be configured to determine a temperature of permanent magnets of the drive motor based on the measurement data obtained from the at least one sensor adapted to sense stray magnetic field of the drive motor of the drive machine, when the conveyor is idle.

The processing unit may be configured to send to the conveyor control unit a data message containing information about temperature of permanent magnets of the drive motor. This information may be used for condition monitoring of the drive motor, as well as for predictive maintenance of the conveyor system.

A rotating portion of the drive machine may comprise an eccentric part made of conductive and/or ferromagnetic material, and at least one sensor may be mounted to immediate vicinity of the eccentric part for measuring the rotor angle of the drive motor of the drive machine.

The conveyor device may comprise a brake control circuit comprising at least one solid state switch configured to control current supply for at least one magnetizing coil of a drive machine brake. The at least one solid state switch may be controlled with a pulse-width modulation generated by the processing unit. Furthermore, the brake control circuit may comprise a DC link, and wherein a power supply cable may be arranged between the conveyor control unit and the brake control circuit to energize the DC link. At least one sensor of the sensor array may be adapted to sense a movement of an armature of the drive machine brake, and wherein the processing unit may be configured to determine an operation of the drive machine brake based on measurement data obtained from the at least one sensor adapted to sense movement of the armature.

The processing unit may be configured to send to the conveyor control unit a data message containing information about operation of the drive machine brake. This information may be used for controlling the conveyor system. With this information it may be possible to detect desired or non-desired operation of the drive machine brakes.

The processing unit and at least one sensor of the sensor array may be referenced to a potential of the drive machine frame.

The sensor array may comprise at least one of the following: Hall sensor, inductive proximity sensor, magneto-resistive sensor, acceleration sensor, current sensor, voltage sensor.

The conveyor system may be one of the following: an elevator system, an escalator system, a moving walk system.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

The present invention relates to a conveyor system comprising a measurement system having a topology that simplifies an interface between a machinery of the conveyor device and the control devices of the conveyor device. The topology of the measurement system also enables a decentralization of an analysis and a signal processing of the measurement data to the machinery side of the system, which minimizes data transfer between a plurality of sensors residing in the machinery side and a control system of the conveyor device. The topology, i.e. an arrangement, according to the present invention also ensures that the measurement data is transferred only as needed, which also optimize the data transfer between the mentioned entities.

Figure 1:
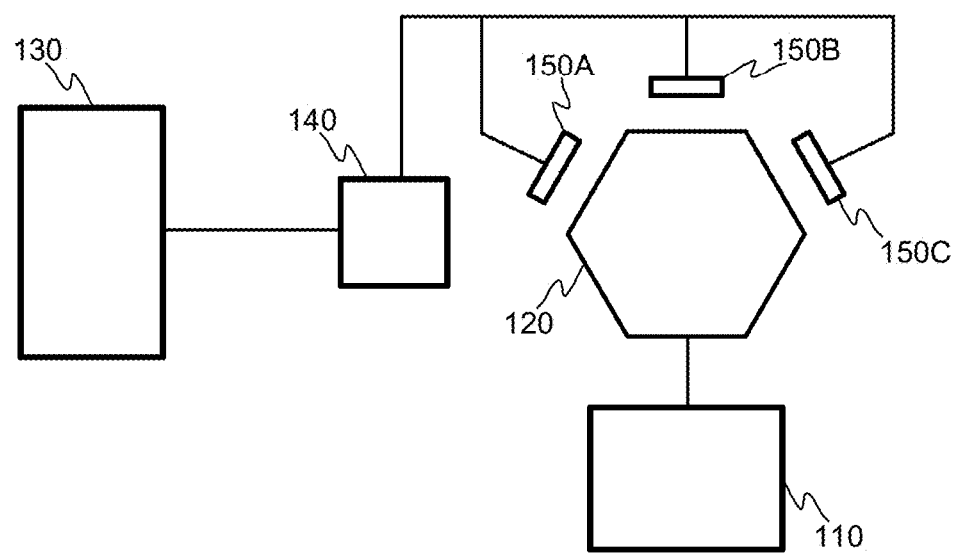
FIG. 1 illustrates schematically a conveyor system according to an embodiment of the present invention.

FIG. 1 schematically illustrates some aspects of the present invention by introducing a conveyor system according to an embodiment of the present invention. The conveyor system according to the present invention may comprise a conveyor device 110, such as an elevator car and a counter weight connected with a rope or a belt or similar into which a power is provided for moving the elevator car along its path. Another non-limiting example of the conveyor device 110 may be an escalator device or a moving walk device with other necessary devices and equipments for being operable. A drive machine 120 of the conveyor system is configured at least to provide power for the conveyor device 110 in order to cause the conveyor device 110 to operate, such as to move, in a designated manner. For example, in a context of an elevator system as the conveyor system the drive machine 120 may comprise a hoisting machine and at least one elevator brake, as will be discussed in more detail later.

Moreover, the conveyor system may comprise a conveyor control unit 130 which may at least be configured to control movement of the conveyor device 110 through a generation of control signals to one or more elements belonging to the conveyor device, such as to the drive machine 120. Moreover, the conveyor control unit 130 may also be arranged to perform a task of supplying power to the drive machine 120, i.e. performing tasks of so called drive unit. The conveyor control unit 130 of the conveyor system may comprise one or more safety circuits, such as a safety shutdown circuit coupled to one or more devices, such as to a brake device, suitable for controlling a movement of the conveyor device 110 in question. The control signals generated by the conveyor control unit 130 may be delivered to the respective entities through a processing unit 140 residing at a machinery side of the conveyor system. Further, the processing unit 140 generates data towards the conveyor control unit 130 e.g. in a manner as will described.

Still further, the conveyor system according to an embodiment of the invention may comprise a measurement system for determine operational aspects of the conveyor system. The processing unit 140 and a number of sensors 150A, 150B, 150C may establish at least a portion of the measurement system. The number of sensors 150A, 150B, 150C may form a sensor array for measuring one or more properties of the target, which may e.g. be the drive machine 120. The properties to be measured may e.g. be physical properties or electrical properties, or anything similar. The processing unit 140 may be associated, according to the present invention, with the drive machine 120 in the machinery side of the conveyor system. The processing unit 140 may obtain measurement data from the sensor array, i.e. from the individual sensors therefrom. The sensors may be mounted to the drive machine 120 and adapted to measure the properties of the drive machine 120 preferably directly, without any additional assisting mechanical linkages, such as encoder wheels. The sensors may be individually wired to the processing unit 140, or the communication may be performed in a wireless manner. For each sensor the wiring may provide supply voltage from the processing unit 140 to the sensor as well as a signal connection from the sensor to the processing unit 140. Furthermore, the processing unit 140 may be communicatively coupled to the conveyor control unit 130 with an applicable communication channel, such as with a serial data bus or a parallel data bus or a combination of them. The processing unit 140 may be configured to process measurement data obtained from the sensor array and to generate information about an operation of the drive machine 120.

In the following further aspects of the present invention relating to the conveyor system is described in contexts of different conveyor systems, such as in a context of elevator system and in a context of escalator system. However, the present invention is not anyhow limited to these only, but it may be applied correspondingly in a context of other conveyor systems, such as moving walk system.

Figure 2:
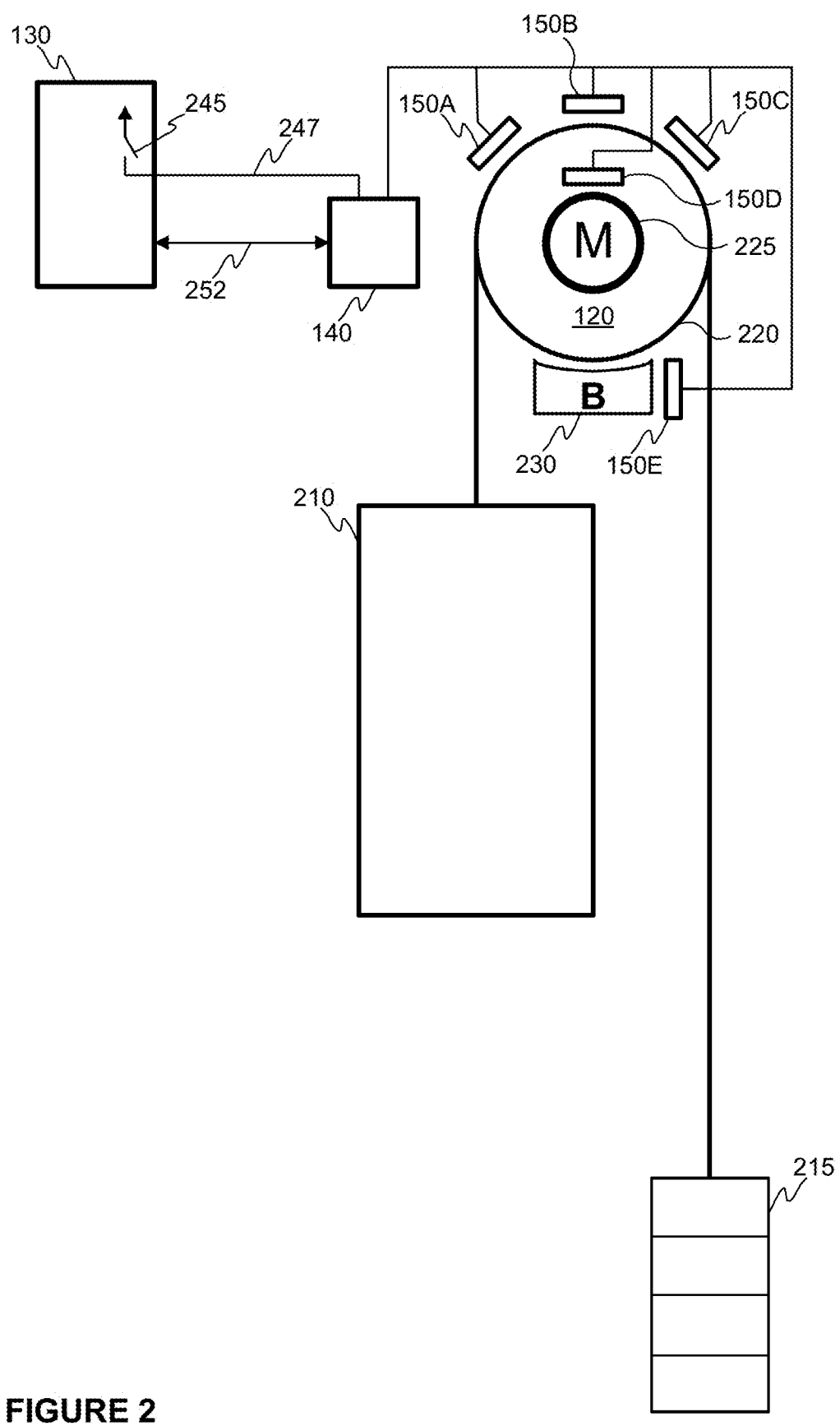
FIG. 2 illustrates schematically an embodiment according to the present invention in which the conveyor system is an elevator system.

FIG. 2 schematically illustrates an embodiment according to the present invention in which the conveyor system is an elevator system in which the measurement system is applied to. The conveyor device 110 in a context of the elevator system may comprise an elevator car 210 coupled to a counter weight 215 via a rope, a belt or similar. The rope, or similar, may travel around a drive sheave 220 of a drive machine 120, i.e. a hoisting machine, into which an electric motor 225 of the drive machine 120 is configured to generate a rotational force to the drive sheave 220 for causing the elevator car 210 to move in response to an operation of the electric motor 225 of the drive machine 120. A brake 230 of the drive machine 120 may be arranged so that when controlled by de-energizing it is configured to meet the drive sheave 220 and, in that manner, to brake a movement of the elevator car 210 or to keep elevator car 210 standstill in the shaft. When the brake 230 is energized, the brake 230 opens, thus allowing the movement of elevator car 210. The elevator system may alternatively be implemented without the counterweight 215. The drive machine 120 may alternatively be in a form of a linear motor, having a stator which extends along the elevator car 210 trajectory in the shaft and a rotor coupled to the elevator car 210. Furthermore, the elevator system may comprise a conveyor control unit 130 which may be configured to control the movement of elevator car 210 through a generation of control signals to one or more elements belonging to the elevator system, such as to the drive machine 120 comprising the elevator brake 230. The conveyor control unit 130 of the elevator system, also known as elevator control unit, may comprise one or more safety circuits, such as a safety shutdown circuit 245 coupled to the brake 230 through a brake supply cable 247 via a processing unit 140. Moreover, the conveyor control unit 130 may also be arranged to perform a task of supplying power to the drive machine 120, i.e. performing tasks of so called drive unit. The FIG. 2 does not illustrate all element of the drive machine 120. For example, some drive machines 120 may comprise further elements, such as a gear box. However, nowadays the drive machines are typically gearless, so no gear box is needed.

The measurement system according to an example embodiment, as schematically depicted in FIG. 2, comprises the processing unit 140 and a number of sensors 150A, 150B, 150C, 150D, 150E forming a sensor array for measuring one or more properties of the drive machine 120, such as physical properties, electrical or magnetical properties, and so on. The processing unit 140 is associated, according to the present invention, with the drive machine 120 in the machinery side of the elevator system. The processing unit 140 may obtain measurement data from the sensor array, i.e. from the individual sensors therefrom. The sensors may be mounted to the drive machine 120 and adapted to measure the properties of the drive machine 120 preferably directly, without any additional assisting mechanical linkages, such as encoder wheels. The sensors 150A, 150B, 150C, 150D, 150E may be individually wired to the processing unit 140, or the communication may be performed in a wireless manner. For each sensor 150A, 150B, 150C, 150D, 150E the wiring may provide supply voltage from the processing unit 140 to the sensor as well as signal connection from the sensor to the processing unit 140. Furthermore, the processing unit 140 may be communicatively coupled to the conveyor control unit 130 with an applicable communication channel, such as with a serial data bus 252 or a parallel data bus or a combination of them.

Figure 3:
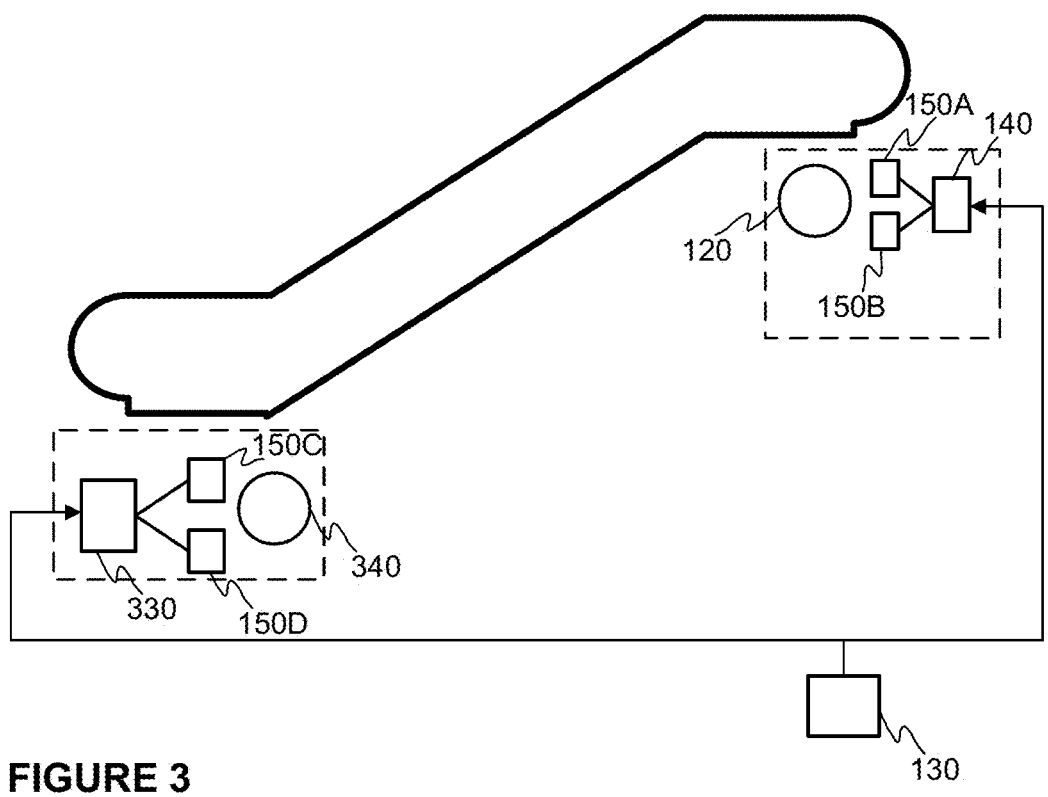
FIG. 3 illustrates schematically an embodiment according to the present invention in which the conveyor system is an escalator system.

FIG. 3 schematically illustrates an embodiment according to the present invention in which the conveyor system is an escalator system in which the measurement system is applied to. The escalator system may comprise a step-chain coupled to a drive machine 120 via a bearing. The drive machine 120 may generate a rotational force for causing the step-chain to move in an intended travelling direction. A brake of the drive machine 120 may be arranged so that when de-energized it is configured to meet the rotating axis of the drive machine 120 and, in that manner, to brake movement of the step-chain or keep the step-chain standstill when the escalator system is idle. When energized, the brake opens, allowing movement of step-chain. The drive machine 120 may comprise, in the context of escalator system, a gearbox with the mentioned entities. Furthermore, the escalator system may comprise a conveyor control unit 130 which may e.g. be configured to control the movement of step-chain through a control of a power supply to the drive machine 120 and to the escalator brake. Thus, the conveyor control unit 130 may be configured to execute tasks of a drive unit and an escalator control board.

The measurement system according to an example embodiment as illustrated in FIG. 3 may comprise a processing unit 140 and a number of sensors 150A, 150B forming a sensor array for measuring one or more properties of the drive machine 120, such as physical properties, electrical properties, magnetical properties and so on. The processing unit 140 is associated, according to the present invention, with the drive machine 120 in the machinery side of the escalator system. The processing unit 140 may obtain measurement data from the sensor array, i.e. from the individual sensors therefrom. The sensors may be mounted to the drive machine 120 and adapted to measure the properties of the drive machine 120 preferably directly, without any additional assisting mechanical linkages, such as encoder wheels. The sensors may be individually wired to the processing unit, or the communication may be performed in a wireless manner. For each sensor the wiring may provide supply voltage from the processing unit to the sensor as well as signal connection from the sensor to the processing unit 140. Furthermore, the processing unit 140 may be communicatively coupled to the conveyor control unit 130 with an applicable communication channel, such as with a serial data bus or a parallel data bus or a combination of them.

In some embodiments a second drive machine 340 may be provided, for example, at the opposite end of the step-chain. Then a second processing unit 330 as well as further sensors 150C, 150D may be mounted to the second drive machine, in the way disclosed above. The second processing unit 330 may be connected to conveyor control unit 130 with the serial data bus, for example, for transferring the processed measurement data to the conveyor control unit 130 for further analysis. Alternatively the measurement system may be implemented so that the second processing unit 330 transfers the data, in a raw form or in a processed form, to the first processing unit 140, which is configured to process all the measurement data and transfer it, through a communication, to the conveyor control unit 130. In other words, the processing unit 140, 330 may be implemented in a distributed manner in the machinery sides of the escalator system and in some implementation they communicate directly with the conveyor control unit 130 whereas in another implementation one of the processing units 140, 330 is selected as a master device for gathering the data from one or more other processing units 140, 330 and to communicate the obtained data, in a predetermined format, to the conveyor control unit 130.

In the above described implementations in the context of escalator system the conveyor control unit 130 may also be arranged to perform a task of supplying power to the drive machine 120, or to the both drive machines 120 and 340, i.e. performing tasks of so called drive unit.

In case the conveyor system is the moving walk system the above given considerations with respect to the present invention at least in the escalator environment are directly applicable.

Figure 4:
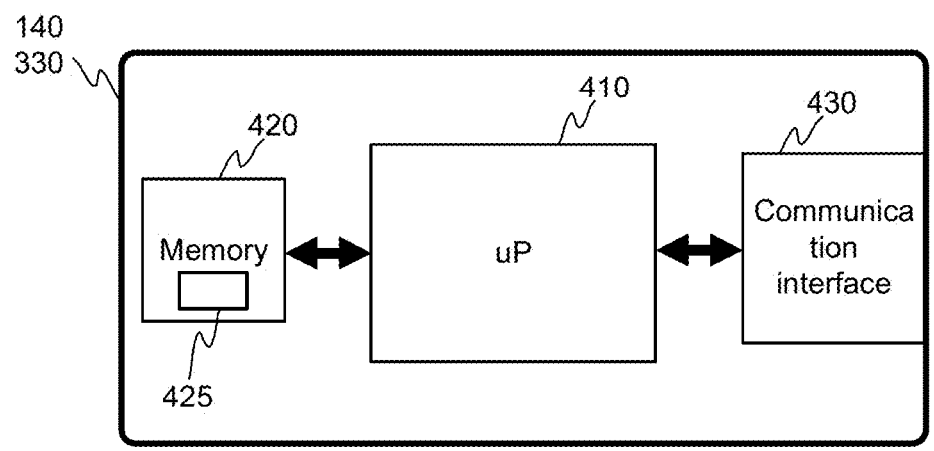
FIG. 4 illustrates schematically a processing unit according to an embodiment of the invention.

FIG. 4 schematically illustrates an example of a processing unit 140, 330 according to an embodiment of the invention. The processing unit 140, 330 may at least be configured to receive and process measurement data from the sensor array to provide information about an operation of the drive machine 120, such as a hoisting machine or drive machine of the escalator system. The processing unit 140, 330 may comprise one or more processors 410, one or more memories 420 and one or more communication interfaces 430 which entities may be communicatively coupled to each other with e.g. a data bus. The communication interface 430 may comprise necessary hardware and functionality for coupling the processing unit e.g. to the serial data bus 252, but also to the sensor array, and to any individual sensor 150A-150E therein. The communication interface may implement either wired or wireless communication protocol or even both and has necessary hardware thereto. The applied communication interfaces may e.g. be RS-485, Modbus, Ethercat, CANopen-Lift, Ethernet (e.g. Wi-Fi, LAN), Bluetooth, and so on. Moreover, the communication may be arranged in synchronous, asynchronous or on-demand manner. Further, the operation of the processing unit 140, 330 may be at least partly controlled by the one or more processors 410 e.g. by executing portions of computer program code 425 stored in the one or more memories 420. Moreover, the computer program code 425 may define instructions that cause the processing unit 140, 330 to operate as described when at least one portion of the computer program code 425 is executed by the processor(s) 410. Naturally, the processing unit 140, 330 as schematically illustrated in FIG. 4 does not comprise all elements of the processing unit 140, 330. For example, the power related elements needed for bringing the processing unit 140, 330 into operation are not shown in FIG. 4. Moreover, in some embodiment of the invention the processing unit 140, 330 may be configured so that it comprises a plurality of processors 410 wherein each processor 410 is arranged to receive measurement data from one or more sensors measuring a similar parameter. In this manner it is possible to increase an efficiency of data processing at the processing unit 140, 330 as well as to improve a reliability of the measurement system.

As described above the processing unit 140, 330 may be configured to obtain, such as by inquiring or by automatically receiving, measurement data from the sensor array for determining at least one operational parameter of the drive machine 120. For achieving this the processing unit 140, 330 may comprise so called sensor fusion portion dedicated to performing the described operation, and any other, to the measurement data. The sensor fusion portion refers to a computer program code and necessary hardware dedicated to the task. Furthermore, the concept of sensor fusion means that measurement information from different sensors 150A-150E is combined in the processing unit 140, 330 to get more accurate and/or more reliable information of a specific operational parameter. For example, an operation of a brake may be measured with a wireless proximity sensor (inductive sensor) measuring position/movement of the brake armature. At the same time, the operation of the brake may be retrieved by measuring current of brake coil. This different measurement data can then be combined in the processing unit 140, 330 to get more reliable information about brake operation, e.g. opening of the brake or applying of the brake.

The measurement data may be used to measure directly or indirectly further properties of the conveyor system, such as an elevator system or an escalator system. A non-limiting example of the properties may be vibration of an elevator components, like pulleys, which is transferred to the sensor array via the hoisting ropes or vibration of an escalator step chain, which is transferred to the sensor array via the bearing.

The sensor array comprises a number of sensors. In case there are a plurality of sensors the individual sensors may be the same type or a different type and configured to measure one or more properties of the hoisting machine. For example, the sensor array may include at least one of the following: Hall sensor, inductive proximity sensor, magneto-resistive sensor, acceleration sensor, current sensor, voltage sensor. By mounting one or more sensors in applicable positions of the drive machine 120, or related devices, such as a brake, the following parameters may e.g. be monitored:
  current
  temperature
  vibration
  voltage
  speed
  angle
  distance of at least two parts.

The monitoring of the above-mentioned parameters may be arranged by processing measurement data obtained from one or more of the mentioned sensors.

Next, it is discussed on a measurement of at least some of the described parameters and at least some examples of a measurement implementations are disclosed in a context of an elevator system. However, the measurement implementation is also applicable to other conveyor systems, such as to escalator system. When the angle of a rotor of the drive machine 120, i.e. the hoisting machine, or corresponding position related parameters, is to be measured an example of the measurement implementation may be such that an eccentric part is arranged in a rotating portion of the drive machine 120. The eccentric part is made of conductive and/or ferromagnetic material. Furthermore, an inductive proximity sensor is mounted to an immediate vicinity of the eccentric part i.e. the inductive part is mounted on a static part of the drive machine 120, such that on the machine frame, so that eccentric part in the rotating portion travels through a measurement volume of the inductive proximity sensor when the rotor is rotated. Thus, the distance between the eccentric part and the inductive proximity sensor changes when the rotor is rotated, e.g. as a function of the rotating angle. In other words, the inductive sensor, such as the inductive proximity sensor, provides a way to measure absolute position change of moving parts/structure free of disturbance of hoisting motors main flux. Through the measurement and with necessary processing of the measurement data it is possible to determine a position of the rotating portion, such as the rotating axis of the drive machine 120, with respect to the static portion, and use that information for determining further parameters, such as the angle of the rotating part of the drive machine or an electrical angle of the rotor in a coordinate system referenced to the stator, and a rotational speed, for example. As a result, the rotor angle may be measured with good accuracy within the entire speed area of the drive machine, such as a hoisting machine. This is an improvement to traditional encoder implementations wherein the quadrature pulse of the encoder provides too little information (e.g. only few pulses) within low speed area and even too much information within high speed area of the drive machine.

On the other hand, the hoisting motor comprising permanent magnets also generates some leakage magnetic flux, i.e. stray magnetic field, which is not part of the main flux generating a torque of the drive machine 120. The stray flux changes during an operation of the drive machine 120 but remains the same at non-excited motor at a same temperature, i.e. before the torque force is generated. Moreover, the change of the stray flux during operation, i.e. during load situation, may be determined. Hence, by measuring the stray flux it may be determined if the drive machine operates properly by comparing the measured values to the predetermined reference values. The measurement of the stray flux may be performed by positioning an applicable sensor, or sensors, to measure the stray flux in the proximity of magnetic circuit of motor, such as on a side of an airgap or at the drive machine windings. Some non-limiting examples of the applicable sensors may be magneto-resistive sensor or Hall sensor. The measurement of stray flux also provides a way to determine a rotor angle based on the measurement data obtained from the sensors, among others. Generally speaking, to measure the stray flux the sensor is advantageously disposed in the immediate vicinity of the electrical motor of the drive machine 120, for example, near the air gap between rotor and stator and/or next to the magnetic circuit of the rotor.

The measurement data of the stray flux may also be used for determining a temperature of the permanent magnets of the drive machine 120. This may be determined by using the measurement data representing stray flux when the elevator is idle i.e. when the drive machine 120 is controlled not to generate the torque force and as the result the motor of the drive machine 120 is stationary. As magnetic field, i.e. the stray flux, is dependent on the temperature it is possible to determine the temperature of the permanent magnets by measuring a parameter being dependent on the magnetic field of the stray flux and compare the parameter to predetermined values and in that manner to determine the temperature. In other words, the predetermined values may e.g. comprise magnetic field-temperature value pairs for a certain material and the processing unit 140, for example, may be configured to determine the corresponding temperature value for a certain magnetic field by inquiring the data from a memory storing the data pairs. It may also be possible to use sensor fusion for determining an operational condition of the magnets by measuring motor temperature with for example an NTC or PTC resistor and at the same time measuring magnetic field of the permanent magnets with hall sensor or magneto-resistive sensor, and then fusioning the information to get the operational condition.

The above described measurement implementations also enable a determination of a load of the conveyor system, such as a load in an elevator. This is especially true when a parameter to be determined represents a distance between at least two predetermined parts of the elevator. The distance measurement may advantageously be arranged with at least one inductive proximity sensor which is suitable for detecting accurate changes in distance. The measurement is based on a fact that mechanical parts of the drive machine 120, and of the elevator system, change their shape, such as bend, when an external force is applied to them. Hence, an elevator system may be designed so that in normal operation without any load the parts are not deforming, but when the elevator system is loaded, the deformation in at least some parts may occur, and this phenomenon may be utilized for determining the load of the elevator through measuring a distance of predefined parts, or elements, belonging to the elevator system. Also here a function representing a distance with respect to a weight, i.e. the load, may be determined through a calibration the system through test measurements. This may refer to loading the elevator with different loads and measuring the distance of the predefined parts, and based on the measured information a function representing the dependence between the load and the distance may be determined. In the following at least some applicable parts whose distance measurement may be used for determining the load of the elevator are introduced:

rotor and stator of the electric motor of the hoisting machine,
motor body and shaft wall (in a machine room less elevator configuration),
bed-plate and floor/support structure,
bottom bracket and machine frame,
elevator car and sling,
traction sheave and supporting frame.

Figure 5:
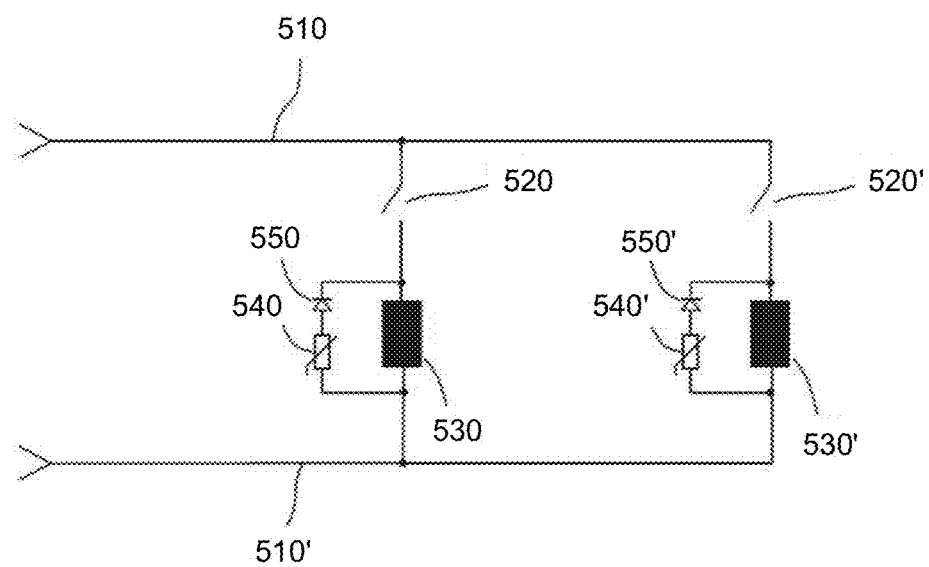
FIG. 5 illustrates schematically a DC link applicable in a context of the present invention according to an embodiment of the invention.

Next some aspects relating to elevator brake of the elevator apparatus according to the present invention are introduced. Namely, according to an embodiment of the invention the processing unit 140 associated with the drive machine 120 may be configured to be a part of a brake control circuit in which the processing unit 140 is configured to generate control signals to at least one solid state switch, which controls current supply for magnetizing at least one coil of a hoisting machine brake 230. An operation of the solid-state switch may be controlled with a pulse-width modulation (PWM) generated by the processing unit 140. In some implementation of the brake control circuit a DC link is arranged in the brake control circuit and a power supply cable is arranged between the conveyor control unit 130 and the brake control circuit to energize the DC link. FIG. 5 schematically illustrates an example of the DC link circuit providing the DC link 510, 510' for supplying power to an electromagnet 530, 530' of the elevator brake. The supply of the power may be controlled by controlling the solid-state switches 520, 520' with PWM generated by the processing unit 140, as mentioned. FIG. 5 also illustrates schematically a discharging circuit for discharging electrical energy charged in inductive components of the electromagnet 530, 530'. Here, the discharging circuit consists of a varistor 540, 540' and a diode 550, 550'.

Furthermore, the elevator brake 230 may be equipped with one or more sensors e.g. belonging to the sensor array. The sensor, or sensors, may be adapted to sense movement of an armature of the drive machine brake 230. The processing unit 140, 330 may be configured to obtain the measurement data and through processing of the data to determine an operation of the drive machine brake 230. A non-limiting example of the applicable sensor, or sensors, may be inductive proximity sensor. This kind of implementation enables a local controlling of the drive machine brake 230 at the drive machine 120 end wherein the processing unit 140 is arranged.

As described the processing unit 140 receives the measurement data from the sensor array comprising at least one sensor 150A-150E. The measurement data may represent directly at least one operational parameter of the drive machine 120, or the operational parameter(s) may be generated from the measurement data. Further, the processing unit 140 may have access to reference data for comparing the operational parameter derived from the measurement data to the reference data and in that manner to detect deviations in the operation of the drive machine 120. In response to the detection of the deviation the processing unit 140 may be configured to determine a reason for the deviation. The reason may be determined by inquiring the reason from a memory by including at least a portion of the measurement data in the inquiry, wherein the memory returns an indication on the reason corresponding the information included in the inquiry. Alternatively or in addition, the processing unit 140 may be configured to inquire the reason from any external entity, such as from a data center, if a communication channel may be established between the entities. For example, the data indicating the reason for the deviation may disclose that the hoisting motor 225 is not driven optimally e.g. due to wrong drive motor parameters. This kind of detection may e.g. be generated from the measurement data of the magnetic fields of the drive machine 120 during a run of the conveyor, wherein the reference data may correspond to one when the elevator operates as desired. Correspondingly, it is possible to generate condition information, such as an indication, of the drive machine 120 by analyzing measurement data obtained from sensors 150A-150E measuring parameters, representing either directly or indirectly, an operation of the drive machine 120. The processing unit 140, 330 may also send the obtained measurement data to a remote server, which will process the data and generate service requests to ensure reliable and continuous elevator operation without service breaks.

Advantageously, electromagnetic compatibility (EMC) is taken into account in the elevator apparatus according to the present invention. For example, the processing unit 140, 330 and the sensor array may be coupled to the same potential with the hoisting machine 120, such as by coupling the mentioned entities electrically to a frame of the drive machine 120. This may reduce common-mode noise. In some embodiments, a galvanic isolation is provided in the connection interface between the movement control unit and the processing unit to further improve EMC properties of the system.

Furthermore, the implementation according to the present invention in which the processing unit 140 is associated with the drive machine 120 and wherein at least one sensor 150A-150E belonging to the sensor array is mounted in a predetermined location within the drive machine enables a utilization of wireless communication between the mentioned entities. For example, a short-range wireless communication may be used for arranging the data transfer between the sensors 150A-150E and the processing unit 140. In such an implementation the sensor 150A-150E in question is advantageously equipped with a communication module implementing the wireless communication technology and is configured to communicate with the processing unit 140 through the communication interface 430 of the processing unit 140.

The present invention is herein mainly described by referring to measuring one or more parameters representing an operation of the drive machine 120 of the elevator apparatus. However, the inventive idea may also be applied to other environments in which the apparatus is configured to convey load, such as people, from one place to another. For example, the invention may be implemented in connection with escalator motor drives and with moving walkaway motor drives.

Elevator control unit may be a drive unit of elevator hoisting machine or the control unit processing elevator calls or the operation control unit mounted to elevator car, or similar conveyor device. The tasks of the elevator control unit may be, in at least some embodiments of the present invention, be performed by the conveyor control unit 130 as depicted in the Figures. In some embodiments the conveyor control unit 130 may also perform the tasks of call processing unit for instructing the elevator operation in accordance with elevator calls. The conveyor control unit, or at least portion of it, may be implemented in a conveyor device, such as in an elevator car, and it may perform a plurality of tasks therein, such as monitoring an operation of the elevator car and/or elevator system and controlling these.

In some embodiments the conveyor system may include further processing units with associated sensors disposed in different positions. In an embodiment, a further processing unit may be mounted to a conveyor device, such as to an elevator car, and one or more sensors may be connected to the processing unit and fitted to measure operational parameters of the conveyor device, such as an operation of safety gear, operation of car brakes as disclosed in EP 0856485 A1 or similar, an operation of load weighing device, such as a strain gauge mounted to an elevator car, a vibration of elevator car, et cetera. If an elevator has one or more car brakes which are mounted to the car or car sling and adapted to engage against guide rail to brake movement of car, this further processing unit may be fitted to measure operational parameters of the one or more car brakes as well. In this case a communication channel may be arranged between the processing unit mounted to conveyor device, like the elevator car, and the conveyor control unit mounted to a shaft, a landing or a machine room, for example. A wired communication channel may be established via travelling cable or alternatively a wireless communication channel may be established with wireless communication means.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A conveyor system wherein the conveyor system comprises:
   a drive machine,
   a conveyor control unit configured to control operation of a conveyor device,
   a sensor array comprising a plurality of sensors mounted directly to the drive machine and adapted to measure different properties of the drive machine, wherein at least one of the plurality of sensors detects a physical property of the drive machine,
   a processing unit associated with the drive machine and comprising a sensor fusion portion, wherein the processing unit is connected to the sensor array and configured to obtain and process measurement data from the sensor array so as to determine, by the sensor fusion portion of the processing unit at least one operational parameter of the drive machine from the measurement data obtained from the plurality of sensors of the sensor array to generate information about an operation of the drive machine, and
   a communication channel between the conveyor control unit and the processing unit.

2. The conveyor system of claim 1, wherein the processing unit is configured to send to the conveyor control unit a data message containing information about the operation of the drive machine.

3. The conveyor system of claim 1, wherein the processing unit is configured to detect a non-optimal operation of the drive machine by detecting a deviation of the at least one operational parameter of the drive machine compared to a reference value.

4. The conveyor system of claim 3, wherein the processing unit is configured to send to the conveyor control unit a data message containing information about non-optimal operation of the drive machine.

5. The conveyor system of claim 1, wherein the processing unit is configured to generate condition information of the drive machine based on measurement data obtained from the sensor array.

6. The conveyor system of claim 5, wherein the processing unit is configured to send to the conveyor control unit a data message containing condition information of the drive machine.

7. The conveyor system of claim 1, wherein at least one sensor of the sensor array is adapted to sense a position of a rotating axis of the drive machine relative to a drive machine frame, and wherein the processing unit is configured to determine a load weight of the conveyor device based on the measurement data obtained from the at least one sensor adapted to sense the position of the rotating axis of the drive machine relative to the drive machine frame.

8. The conveyor system of claim 7, wherein the processing unit is configured to send to the conveyor control unit a data message containing information about load weight of the conveyor device.

9. The conveyor system of claim 1, wherein the conveyor device comprises a brake control circuit comprising at least one solid state switch configured to control current supply for at least one magnetizing coil of a drive machine brake.

10. The conveyor system of claim 9, wherein the brake control circuit comprises a DC link, and wherein a power supply cable is arranged between the conveyor control unit and the brake control circuit to energize the DC link.

11. The conveyor system of claim 9, wherein at least one sensor of the sensor array is adapted to sense a movement of an armature of the drive machine brake, and wherein the processing unit is configured to determine an operation of the drive machine brake based on measurement data obtained from the at least one sensor adapted to sense movement of the armature.

12. The conveyor system of claim 11, wherein the processing unit is configured to send to the conveyor control unit a data message containing information about operation of the drive machine brake.

13. The conveyor system of claim 1, wherein the processing unit and at least one sensor of the sensor array are referenced to a potential of the drive machine frame.

14. The conveyor system of claim 1, wherein the sensor array comprises at least one of the following: Hall sensor, inductive proximity sensor, magneto-resistive sensor, acceleration sensor, current sensor, voltage sensor.

15. The conveyor system of claim 1, wherein the conveyor system is one of the following: an elevator system, an escalator system, a moving walk system.

16. A conveyor system wherein the conveyor system comprises:
   a drive machine,
   a conveyor control unit configured to control operation of a conveyor device,
   a sensor array comprising a plurality of sensors mounted to the drive machine and adapted to measure different properties of the drive machine,
   a processing unit associated with the drive machine and comprising a sensor fusion portion, wherein the processing unit is connected to the sensor array and configured to obtain and process measurement data from the sensor array so as to determine, by the sensor fusion portion of the processing unit at least one operational parameter of the drive machine from the measurement data obtained from the plurality of sensors of the sensor array to generate information about an operation of the drive machine, and a communication channel between the conveyor control unit and the processing unit, wherein at least one sensor of the sensor array is adapted to sense a stray magnetic field of a drive motor of the drive machine, and wherein the processing unit is configured to determine a rotor angle of the drive motor based on the measurement data obtained from the at least one sensor adapted to sense the stray magnetic field of the drive motor of the drive machine.

17. The conveyor system of claim 16, wherein the processing unit is configured to send to the conveyor control unit a data message containing information of the rotor angle of the drive motor.

18. A conveyor system wherein the conveyor system comprises:
a drive machine,
a conveyor control unit configured to control operation of a conveyor device,
a sensor array comprising a plurality of sensors mounted to the drive machine and adapted to measure different properties of the drive machine,
a processing unit associated with the drive machine and comprising a sensor fusion portion, wherein the processing unit is connected to the sensor array and configured to obtain and process measurement data from the sensor array so as to determine, by the sensor fusion portion of the processing unit at least one operational parameter of the drive machine from the measurement data obtained from the plurality of sensors of the sensor array to generate information about an operation of the drive machine, and
a communication channel between the conveyor control unit and the processing unit,
wherein at least one sensor of the sensor array is adapted to sense a stray magnetic field of the drive motor of the drive machine, when a conveyor is idle, and wherein the processing unit is configured to determine a temperature of permanent magnets of the drive motor based on the measurement data obtained from the at least one sensor adapted to sense stray magnetic field of the drive motor of the drive machine, when the conveyor is idle.

19. The conveyor system of claim 18, wherein the processing unit is configured to send to the conveyor control unit a data message containing information about the temperature of permanent magnets of the drive motor.

20. A conveyor system wherein the conveyor system comprises:
a drive machine,
a conveyor control unit configured to control operation of a conveyor device,
a sensor array comprising a plurality of sensors mounted to the drive machine and adapted to measure different properties of the drive machine,
a processing unit associated with the drive machine and comprising a sensor fusion portion, wherein the processing unit is connected to the sensor array and configured to obtain and process measurement data from the sensor array so as to determine, by the sensor fusion portion of the processing unit at least one operational parameter of the drive machine from the measurement data obtained from the plurality of sensors of the sensor array to generate information about an operation of the drive machine, and
a communication channel between the conveyor control unit and the processing unit,
wherein a rotating portion of the drive machine comprises an eccentric part made of conductive and/or ferromagnetic material, and at least one sensor is mounted to immediate vicinity of the eccentric part for measuring the rotor angle of the drive motor of the drive machine.

21. A conveyor system wherein the conveyor system comprises:
a drive machine,
a conveyor control unit configured to control operation of a conveyor device,
a sensor array comprising a plurality of sensors mounted to the drive machine and adapted to measure different properties of the drive machine,
a processing unit associated with the drive machine and comprising a sensor fusion portion, wherein the processing unit is connected to the sensor array and configured to obtain and process measurement data from the sensor array so as to determine, by the sensor fusion portion of the processing unit at least one operational parameter of the drive machine from the measurement data obtained from the plurality of sensors of the sensor array to generate information about an operation of the drive machine, and
a communication channel between the conveyor control unit and the processing unit,
wherein the conveyor device comprises a brake control circuit comprising at least one solid state switch configured to control current supply for at least one magnetizing coil of a drive machine brake,
wherein the at least one solid state switch is controlled with a pulse-width modulation generated by the processing unit.

* * * * *